United States Patent [19]

Walker

[11] 4,018,105
[45] Apr. 19, 1977

[54] MULTIPLE OUTPUT GEARED TRANSMISSION

[75] Inventor: Elbert Walker, Pampa, Tex.

[73] Assignee: Cabot Corporation, Boston, Mass.

[22] Filed: May 9, 1975

[21] Appl. No.: 575,956

[52] U.S. Cl. .................. 74/665 GE; 74/665 L; 74/665 P; 74/15.66
[51] Int. Cl.² ........................................ F16H 37/06
[58] Field of Search ......... 74/665 L, 665 A, 665 B, 74/665 E, 665 P, 665 R, 665 GE, 15.2, 15.66, 15.8

[56] References Cited
UNITED STATES PATENTS

| | | | |
|---|---|---|---|
| 2,890,034 | 6/1959 | Robbins et al. | 74/665 L X |
| 3,157,065 | 11/1964 | Isenberg et al. | 74/665 L X |
| 3,888,326 | 6/1975 | Osborne | 74/665 L |
| 3,926,072 | 12/1975 | Richardson | 74/665 L X |

*Primary Examiner*—Edgar W. Geoghegan
*Attorney, Agent, or Firm*—Jack Schuman; Barry R. Blaker; Lawrence A. Chaletsky

[57] ABSTRACT

There is disclosed a multiple output belt driving geared transmission wherein control of the speed and power delivered to the belt means and subsequent prime user is provided.

9 Claims, 2 Drawing Figures

MULTIPLE OUTPUT GEARED TRANSMISSION

BACKGROUND OF THE INVENTION

The present invention relates generally to multiple speed transmissions and is more particularly concerned with multiple output geared transmissions.

In view of the extensive and rapid depletion of existing crude oil reserves there has developed an intensive search for new sources of oil. Extensive exploration has led to the discovery of potentially valuable oil bearing formations in such remote areas as Alaska and Peru. Interestingly, despite the disparate geographic and climatic differences attendant these finds, many of the requirements for drill rigs suitable for exploratory and production drilling in such unpopulated wilderness areas are quite similar. One such requirement is that the drill rig be capable of disassembly into components of sufficiently small size and weight as to be susceptible of movement to and from the drill site by means of helicopter transportation. Too, also arising as a result of the primitive conditions attendant these remote well sites, it is further important that the design of the drill rigs be such that they are simple and easy to service.

One of the factors which has, heretofore, mitigated against the provision of suitable drill rigs for remote locations has resided in the inability to perform a sufficiently light-weight disassemblable power group to service the drill rig, one of the difficulties being that the prime movers conventional in the art are usually available only with transmissions which are integral therewith. Such conventional power group designs, while convenient where site access and rig maintenance pose few problems, are not generally acceptable for operations in remote areas since such integrated prime mover/transmission assemblies are generally excessively heavy for helicopter transportation thereof and are complex and difficult to service.

In accordance with the present invention, however, these problems have been substantially ameliorated.

OBJECTS OF THE INVENTION

It is a principal object of the invention to provide a novel multiple output belt driving geared transmission.

It is another object of the invention to provide a multiple output belt driving geared transmission whereby control of the speed and power delivered to the driven belt and the subsequent prime user is afforded.

It is another object of the invention to provide a novel multiple output belt driving geared transmission adapted for facile coupling and uncoupling thereof to one or more prime movers therefor and to the prime user.

It is still another object of the invention to provide a novel multiple output belt driving geared transmission having features of simplicity, easy accessibility and maintainability.

It is another object of the invention to provide a novel drawworks power train for drill rigs, said power train being possessed of features of facile takedown into relatively lightweight components, maintainability and simplicity.

Other objects and advantages of the present invention will in part be obvious and will in part appear hereinafter.

SUMMARY OF THE INVENTION

In accordance with the present invention, there is provided a novel multiple output belt driving geared transmission comprising a gearcase, a geared power input shaft adapted for communication with one or more prime movers, a reduction gear train in communication with said geared input shaft and comprising a plurality of gears driven at differing speeds relative to the rotational speed of said power input shaft, a plurality of power output shafts in association with said driven gears of said reduction gear train, a plurality of selectively clutchable driven rotational power output elements coupled to said output shafts and a driven flexible continuous belt means reeved about and coupled to said plurality of rotational power output elements so as to be driven in a common direction thereby. In the drawworks power train assembly of the invention there is included in the above one or more prime movers coupled to said input shaft and a drawworks prime user coupled to said driven flexible continuous belt means.

THE DRAWINGS

DETAILED DESCRIPTION OF THE INVENTION AND PREFERRED EMBODIMENTS

Figure 1:
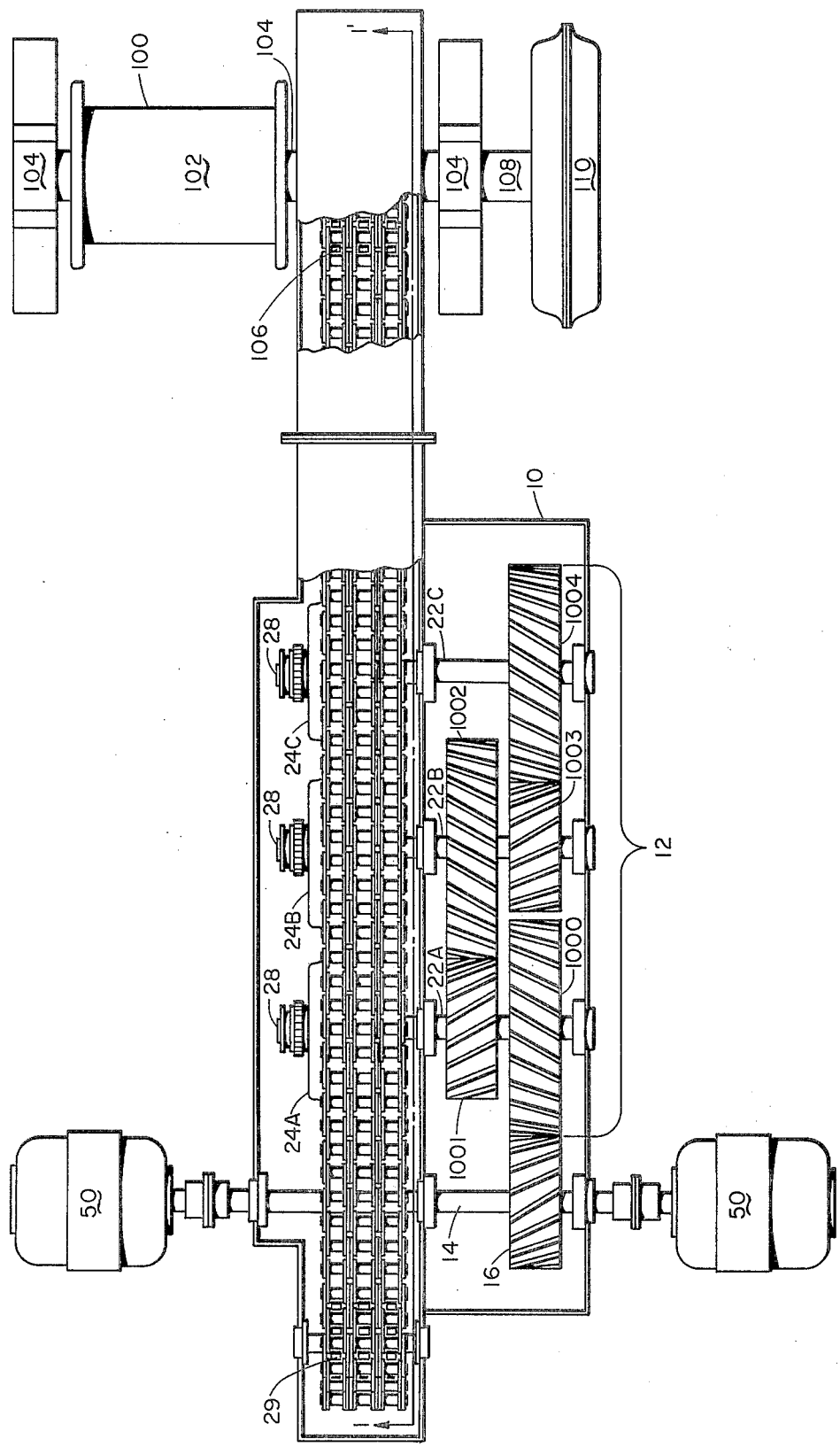
FIG. 1 is a diagrammatic, schematic, partially sectional, extended top view of a drill rig drawworks power train comprising transmission means in accordance with the invention.

Referring now to FIG. 1, the geared transmission of the present invention comprises a general gearbox 10 containing therein a reduction gear train referenced generally as 12. Suitably journalled in said gearbox 10 is a power input shaft 14 having affixed thereto a power input gear 16. At least one end of said shaft 14 extends outwardly from said gearbox 10 and is coupled to a prime mover 50. Said prime mover 50 can be of any type suitable to the task, such as gasoline or diesel powered engines or can even comprise a handcrank. However, from the standpoint of flexibility of operations, compactness and ready replaceability, it is generally preferred that, when the transmission is to form part of a drawworks power train, said prime mover 50 comprise a d.c. electric motor. For this application it is also preferred that two prime movers 50 be employed, each being coupled to the respective ends of shaft 14. In this last embodiment, the respective directions of rotation of prime movers 50 should normally be such as to provide a cooperative input of power into a shaft 14.

Reduction gear train 12 comprises a number of reduction gears 1000 through 1004 arranged in driven communication with said power input gear 16. Said gears may be of the spur, helical or herringbone type and are affixed to shafts 22A, 22B and 22C which, in turn, are suitably journalled to gearbox 10.

At least a number of said shafts 22A-C are designated as power output shafts and extend from a common side of said gearbox 10. To said extending portions of said designated power output shafts are affixed selectively clutchable rotational power output elements 24A, 24B and 24C, respectively, which elements 24 are adapted for establishing a driving relationship with respect to a continuous or endless flexible belt means 26. Accordingly, the rotational power output elements 24 can take the form of sheaves, V-belt pulleys, spools, sprockets or other devices adapted for the delivery of power to a cooperative flexible continuous belt driven means 26. The cooperative continuous flexible belt means 26 can take the form of toothed belts, flat belts, V-belts, ropes, bands, roller chains, inverted chains and the like. In the case of a drill rig drawworks power train, it is generally preferred that each rotational power output element 24 comprise a sprocket, particularly in the form of a multiple sprocket array, as shown, and the corresponding continuous flexible belt means 26 comprise separate roller chains serving each of said sprockets.

As mentioned, it is all important that each of the rotational power output elements 24 be adapted for selective clutching thereof, it being important that only one of the total number of said elements 14 be engaged during operations. To this end, therefore, each said rotational power output element 24 is equipped with a selective clutch element 28 and is mounted to its corresponding shaft 22 by means of anti-friction bearings, such as taper roller bearings. Thus, when the clutch element 28 serving its corresponding rotational power output element 24 is disengaged, said rotational power output element will be free to spin at the speed of the continuous flexible belt means 26 and will be totally independent of the rotation of its corresponding power output shaft 22. The selective clutch element 28 can be a conventional spline clutch, air friction clutch, mechanical friction clutch, hydraulic clutch, electro-magnetic clutch or the like. When the clutch element is engaged, of course, the power output of a particular shaft 22 is transmitted into its corresponding rotational power output element 24 and thence into flexible belt means 26.

While the directions of rotation of rotational power output elements 24 need not be the same, it is important that the flexible belt means 26 be reeved in such a manner that the selected power input transmitted thereto by each element 24 be uniformly directed. Accordingly, referring now to FIG. 2, it will be seen that despite the fact that rotational power output element 24B rotates in a direction opposite that of rotational power output elements 24A and 24C the power delivered to flexible belt 26 by any one of said elements 24A–24C is oriented in a common direction due to reeving of the continuous flexible belt means 26 over each of elements 24A and 24C and under element 24B. Too, it will be seen that the flexible belt means 26 is maintained at suitable tension by one or more fixed idlers 29 and one or more adjustable idlers 30. In FIG. 1, the complete power train comprises the prime mover(s) 50, the multiple output geared transmission of the invention and a drill rig drawworks 100 prime user. Said prime user comprises a spool 102 coupled to a belt driven input means 106. Said means 106, of course, is suitably adapted to receive power delivered through flexible belt means 26 and thus may comprise one or more pulleys, sheaves, sprockets or the like. Shaft 104, serving spool 102, is suitably journalled and may be coupled through an over-running clutch 108, such as a sprag or roller clutch, to a suitable hydrodynamic retarder 110. Such hydrodynamic retarders or "hydrotarders" are conventionally employed in the drill rig art to control the rate of free spooling of drawworks spool 102.

In a specific working example of the multiple takeoff geared transmission of the present invention, prime movers 50 comprise d.c. electric motors, each being rated for intermittent operations at 500 h.p. and 2500 r.p.m., are coupled to input shaft 14 s0 as to conjointly drive said shaft in the same direction. Pertinent dimensions of the reduction gear train, comprising helical gears, are as follows:

| Gear Reference Number | Pitch Diameter (inches) |
|---|---|
| 16 | 12 |
| 1000 | 20 |
| 1001 | 13 |
| 1002 | 20 |
| 1003 | 12 |
| 1004 | 20 |

Figure 2:
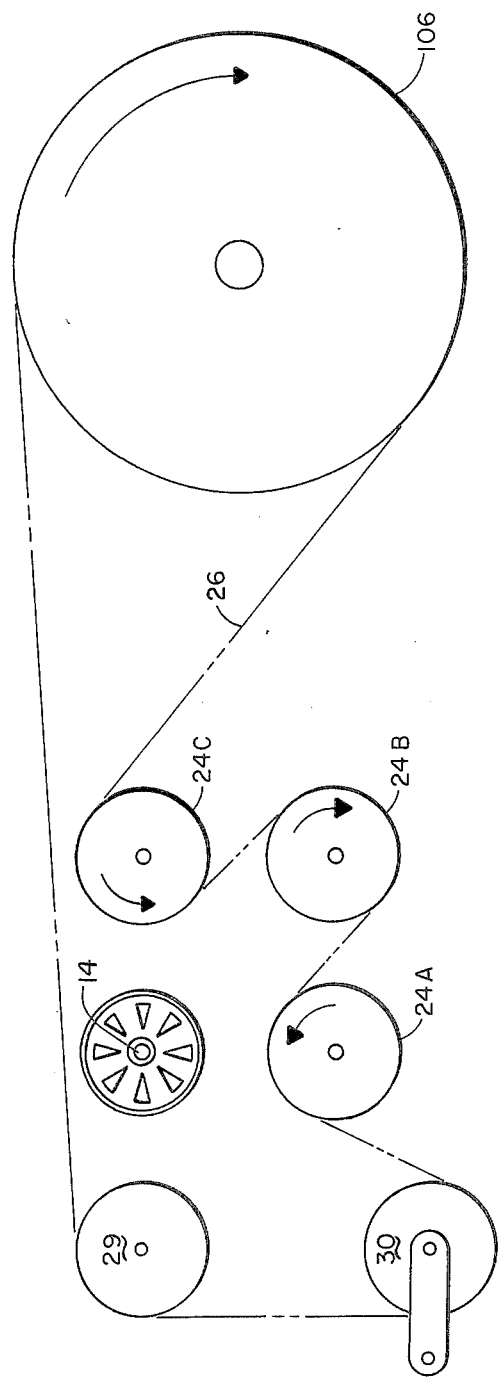
FIG. 2 is a diagrammatic, schematic side view of the apparatus of FIG. 1, taken through line 1–1' thereof and comprising a suitable reeving scheme therefor.

In this specific embodiment, the rotational power output elements 24 each comprise a triple-paired sprocket of 11.958 inch pitch diameter, said sprockets serving three roller chains comprising the flexible belt means 26, each chain being reeved about its corresponding sprocket pairs in the manner depicted in FIG. 2 hereof. Clutches 28, serving each of power output elements 24A, 24B and 24C, are each of the spline type and are selectively and manually engageable. The prime user is a drawworks comprising a spool 102 of 25 inch diameter and an input means 106 comprising a ganged multiple sprocket arrangement of 38.138 inch pitch diameter.

As a result of this above arrangement, the rotational speeds of shafts 22A, 22B and 22C, for an input shaft 14 speed of 2500 r.p.m., are: 1500 r.p.m., 975 r.p.m. and 585 r.p.m., respectively. Thus, by selective clutching and engagement of only one of the rotational power output elements 24A, 24B or 24C, three different speeds may be delivered to belt means 26 and to the prime user drawworks. Accordingly, at 2500 r.p.m. prime mover speed, selective engagements of either 24A or 24B or 24C yield drawworks spool 102 speeds of 3133 ft/min, 2037 ft/min and 1222 ft/min, respectively.

Obviously, many changes and modifications may be made in the above description and drawings without departing from the essential spirit and scope of the invention. For instance, the number of outputs from the geared transmission means of the invention is susceptible of considerable variation within practical limits and is thus not limited to the three outputs specifically shown in the drawing and discussed in the working example hereof. Moreover, the choice of gear ratios is also susceptible of considerable variation and will be dictated to a large extent by the prime mover and prime user speeds and power requirements contemplated rather than by any inherent criticality attendant the arrangement of the invention.

Accordingly, the above description is intended to be illustrative in nature and is in no way limiting of the invention.

The embodiments of the invention in which an exclusive property or privilege is claimed are defined as follows:

1. A multiple output transmission comprising a gearcase, a geared power input shaft input shaft extending into and being journalled to said gearcase, a reduction gear train comprising a plurality of gears journalled in said gearcase in driven communication with said geared input shaft, a plurality of power output shafts affixed to said driven gears of said reduction gear train and extending outwardly from a common side of said gearcase, a plurality of selectively clutchable rotational power output elements coupled to said outwardly extending power output shafts and a flexible continuous belt means in driven relationship with said plurality of rotational power output elements and reeved thereabout so as to be driven in a common direction upon selective clutching of any one of said rotational power output elements.

2. The transmission of claim 1 wherein said power input shaft extends through said gearcase.

3. The transmission of claim 1 wherein the clutching means employed to selectively clutch said rotational power output elements are spline clutches.

4. The transmission of claim 1 wherein each said rotational power output element comprises a sprocket and said flexible continuous belt means comprises a roller chain.

5. The transmission of claim 4 wherein each said rotational power output element comprises a multiple sprocket and said flexible continuous belt means comprises a plurality or roller chains.

6. A drawworks power train comprising:
A. a multiple output transmission comprising a gearcase, a geared power input shaft extending into and being journalled to said gearcase, a reduction gear train comprising a plurality of gears journalled in said gearcase in driven communication with said geared power input shaft, a plurality of power output shafts affixed to said driven gears of said reduction gear train and extending outwardly from a common side of said gearcase, a plurality of selectively clutchable rotational power output elements coupled to said outwardly extending power output shafts and a flexible continuous belt means in driven relationship with said plurality of rotational power output elements and reeved thereabout so as to be driven in a common direction upon selective clutching of any one thereof;
B. at least one prime mover coupled to said input shaft of (A); and
C. a drawworks comprising a belt driven input means coupled in driven relationship with said flexible continuous belt means of (A).

7. The drawworks power train of claim 6 wherein said power input shaft of (A) extends through said gearcase; wherein a prime mover is coupled to each extending end thereof and wherein said prime movers operate cooperatively to drive said shaft in a common direction.

8. The drawworks power train of claim 6 wherein each said prime mover is a d.c. electric motor.

9. The drawworks power train of claim 6 wherein each said rotational power output element comprises a multiple sprocket and said flexible continuous belt means comprises a plurality of roller chains.

* * * * *

UNITED STATES PATENT OFFICE
CERTIFICATE OF CORRECTION

PATENT NO. : 4,018,105
DATED : April 19, 1977
INVENTOR(S) : Elbert Walker

It is certified that error appears in the above-identified patent and that said Letters Patent are hereby corrected as shown below:

Column 3, line 17, "14" should read -- 24 --. Column 4, line 2, "500" should read -- 550 --; Column 4, line 3, "sO" should read -- so --. Column 4, line 64, cancel "input shaft", first occurrence. Column 5, line 23, "or" should read -- of --.

Signed and Sealed this nineteenth Day of July 1977

[SEAL]

Attest:

RUTH C. MASON
Attesting Officer

C. MARSHALL DANN
Commissioner of Patents and Trademarks